United States Patent [19]

Hausermann et al.

[11] 4,277,915

[45] Jul. 14, 1981

[54] APPARATUS FOR SHAPING ELECTRODES

[75] Inventors: Marten C. Hausermann; Melvin V. Mues, both of Addison, Ill.

[73] Assignee: Hausermann Abrading & Process Co., Addison, Ill.

[21] Appl. No.: 55,683

[22] Filed: Jul. 6, 1979

[51] Int. Cl.³ .............................................. B24B 19/00
[52] U.S. Cl. ......................................... 51/157; 51/58; 219/69 V
[58] Field of Search ........................ 51/60, 58, 157, 6; 219/69 V

[56] References Cited

U.S. PATENT DOCUMENTS

| 3,322,929 | 5/1967 | Mayer | 219/69 V |
| 3,562,474 | 2/1971 | Sellmann | 219/69 V |
| 3,663,785 | 5/1972 | Hausermann | 219/69 V |
| 3,988,864 | 11/1976 | O'Connor | 51/157 |

Primary Examiner—Harold D. Whitehead

[57] ABSTRACT

Improved apparatus for shaping electrodes wherein an abrasive die member is vertically driven into contact with an electrode workpiece member while the die and workpiece members are oscillated with respect to one another in the horizontal plane with the oscillatory motion being imparted through two improved eccentric spindle assemblies which are simultaneously adjusted to vary the degree of eccentricity and therefore the amplitude of the oscillatory motion.

7 Claims, 5 Drawing Figures 4,277,915

APPARATUS FOR SHAPING ELECTRODES

BACKGROUND OF THE INVENTION

1. Field of the Invention

The present invention relates generally to the field of electrical discharge machining and more particularly to an improved apparatus for abrasively forming electrical discharge machining electrodes.

2. Description of the Prior Art

Prior to the present invention a method and apparatus for forming electrical discharge machining electrodes were disclosed in U.S. Pat. No. 3,663,785 entitled Method of Erosively Shaping a Master Die and U.S. Pat. No. Re. 27,588 entitled Apparatus for Shaping Electrodes, respectively. The method and the apparatus for its implementation involved the use of an abrasive die and an electrode workpiece mounted in working alignment with one another. The die and workpiece are moved relative to one another in a horitzontal oscillatory rotary motion as they are brought together in the vertical direction such that the workpiece is abrasively formed into the same shape and contour as the die member.

In order to accommodate the need to operate the abrading apparatus at different amplitudes of oscillatory rotary motion it was necessary that the eccentricity of the two drive spindles be adjustable. This was accomplished by mounting the eccentric pin of each spindle to the platen to be oscillated with opposed locking wedges. In order to effect an adjustment of the oscillation amplitude the mounting assembly for each drive spindle had to be separately loosened and the opposed wedges moved relating to one another to increase or decrease the offset of the eccentric pin axis from the main rotational axis of the spindle. Since each spindle had to be individually adjusted the adjustment process required an experienced and skilled operator to assure that both spindles were set to the same measure of offset as well as the same point in rotation. Excessive set-up time was thus involved and even minor errors would lead to excessive bearing wear during operation. The overall assembly was, furthermore, much less rigid then required for precision operation.

OBJECTS AND SUMMARY OF THE INVENTION

From the preceding discussion it will be understood that among the various objectives of the present invention are included the following:

the provision of a new and novel apparatus for abrasively forming electrical discharge machining electrodes;

the provision of apparatus of the above-described character wherein the eccentricity of the drive spindles may be simultaneously and equally adjusted; and the provision of apparatus of the above-described character having increased rigidity and accuracy of operation.

These as well as other objectives of the present invention are achieved by providing an improved spindle assembly including first and second end-throw crankshafts each within a spindle having an axial aperture which is offset from the centerline rotational axis of the spindle such that by rotating the crankshaft within the spindle the offset between the crankshaft eccentric and the spindle rotational axis may be adjusted. Each crankshaft is coupled via a belt and pulley arrangement to a common adjustment idler pulley whereby the offset of both crankshaft eccentrics from the centerlines of their respective spindles is simultaneously and uniformly adjustable.

DESCRIPTION OF PREFERRED EMBODIMENT

Figure 1:
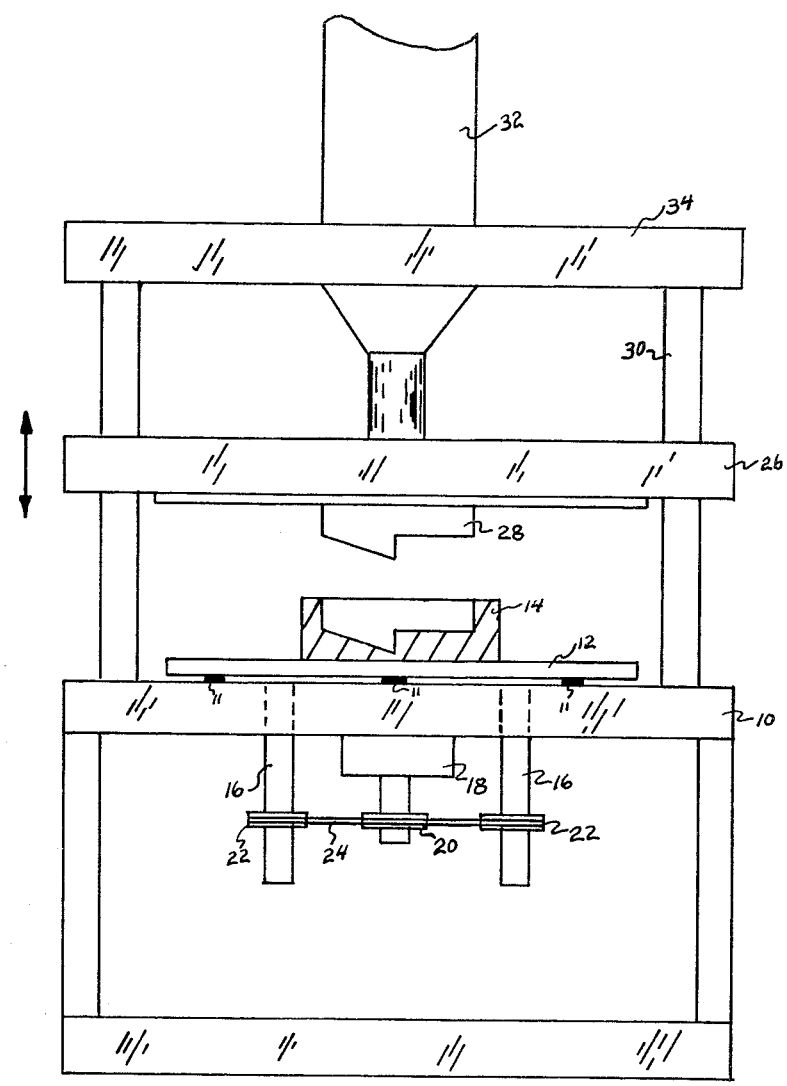
FIG. 1 is a simplified elevation view of an electrode abrading machine showing the environment for the improvement of the present invention.

Turning now to FIG. 1 there is shown a simplified elevation view of an electrode abrading machine of the type with which the improvement of the present invention may be used to advantage. For a detailed description of the basic abrading apparatus reference may be had to U.S. Pat. No. Re. 27,588 and the method for the use of that apparatus is fully set forth in U.S. Pat. No. 3,663,785. The improvement of the present invention resides in the spindle assembly for driving the die or workpiece member in horizontal oscillatory rotary motion. Thus the basic apparatus will be described only insofar as is necessary to describe the improvement.

The electrode abrading apparatus includes a base 10 and a first platen 12 to which is mounted an electrode workpiece member 14. The first platen 12 is supported by first and second spindles 16 which extend upwardly through the base 10. The spindles 16 are eccentrically mounted such that when driven in rotation by a drive motor 18 via pulleys 20, and 22 and belt 24 they synchronously oscillate and impart the required horizontal oscillatory rotary motion to the first platen 12. A second platen 26 to which is mounted an abrading die 28 is disposed in superimposed relation to the first platen 12 and the former is adapted to be driven along the vertical support members 30 by a drive means 32 which is typically a hydraulic ram mounted to the superstructure 34 of the apparatus.

Figure 2:
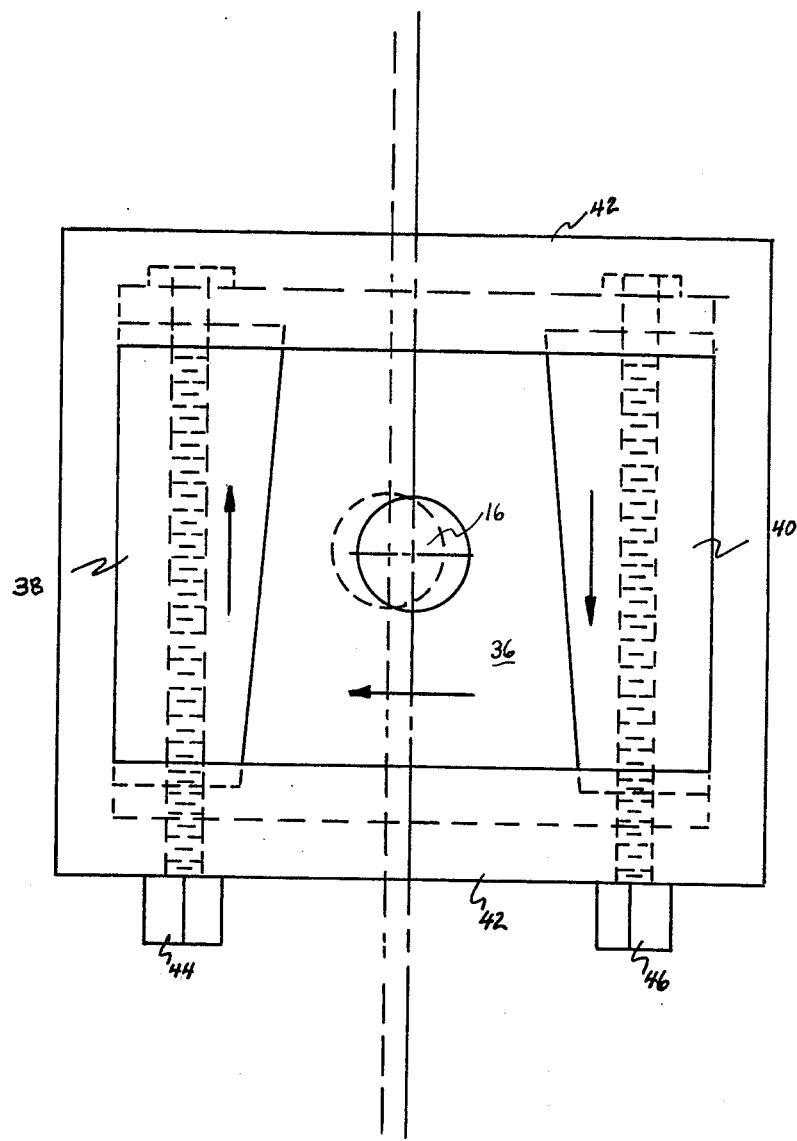
FIG. 2 is a simplified diagramatic view of the prior art spindle offset adjustment arrangement.

FIG. 2 illustrates the manner in which the spindles were heretofore adjustably mounted to the first platen 12 of FIG. 1. The end of each spindle 16 was fixed to a trapezoidal or wedge shaped mounting 36 held between first and second locking wedges 38 and 40. The locking wedges 38 and 40 were adapted to move back and forth within a retainer 42. To adjust the eccentricity of the spindle mounting the two adjusting screws 44 and 46 were turned in opposite directions. For example, to increase the eccentricity the adjusting screw 44 would be loosened and adjusting screw 46 tightened thereby translating the spindle centerline by the desired amount. Because of the requirement that the abrading machine have at least two spindles 16 to insure stability the adjustment of the eccentricity of both spindles by precisely the same amount was complex, time consuming and seldom completely successful. The result was that in operation there was undue vibration, excessive bearing wear and inadequate machine rigidity for precision operations.

Figure 3:
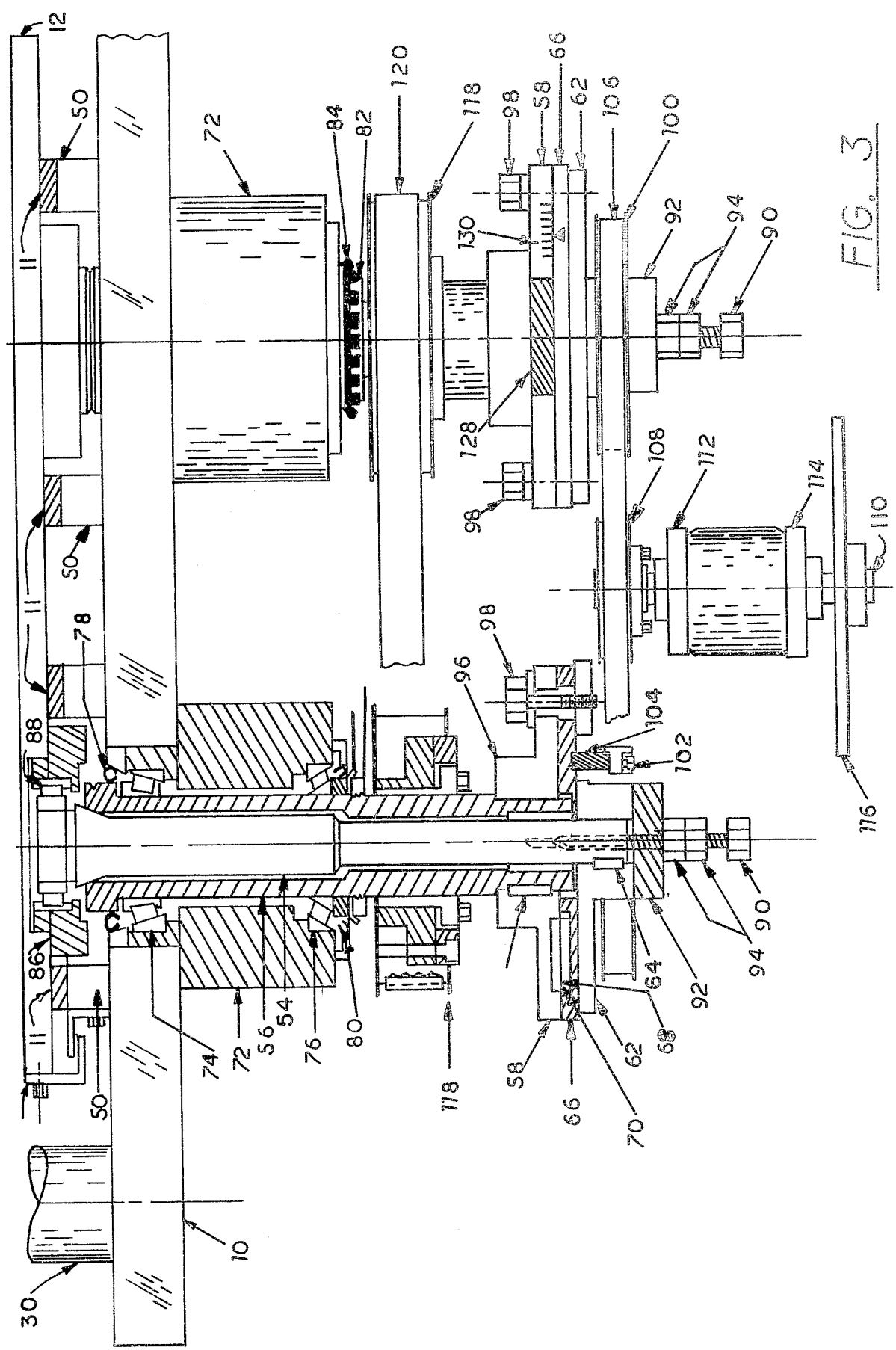
FIG. 3 is a detailed view partially in elevation and partially in section of the improvement of the present invention.

With reference now to FIG. 3 there is shown a detailed view, partially in elevation and partially in section, of improved spindle assemblies for use in electrode abrading apparatus of the type described hereinabove. The two spindle assemblies 16 are disposed through the base 10 and coupled to the first platen 12 which is further supported by a plurality of supporting members 50 topped with bearing wear strips 11.

An end throw crankshaft 54 is disposed within a rotatable spindle 56 through an axial aperture which is offset by a predetermined distance from the centerline rotational axis of the spindle 56. A spindle disc 58 is disposed about and coupled via key 60 to the spindle 56. A crankshaft disc 62 is disposed about and coupled via key 64 to the crankshaft 54. A coupling disc 66 is disposed between the spindle disc 58 and the crankshaft disc 62. The coupling disc is fixed in rotation relative to the crankshaft disc 62 by key 68, however, the keyway 70 in the crankshaft disc 62 is oversize in the radial dimension such that when the entire spindle assembly is rotated the coupling disc 66 and crankshaft disc 62 are free to move radially with respect to one another due to the offset of the crankshaft 54 centerline from the rotational axis of the spindle 56. The spindle 56 is disposed in a spindle journal 72 which is fixed to the underside of base 10 and supported in upper and lower spindle bearings 74 and 76 respectively. Lubricant is retained in the spindle journal 72 by upper and lower bearing seals 78 and 80 respectively. The outer surface of the spindle 56 is threaded to accept a retaining nut 82 and washer 84.

The eccentric upper end of crankshaft 54 is offset from the longitudinal centerline of the crankshaft 54 by an amount equal to the offset of the longitudinal aperture in spindle 56 from its rotational axis. The crankshaft is fixed to the first platen 12 by mounting bracket 86 and an eccentric bearing 88. The lower end of the crankshaft 54 has a threaded aperture adapted to receive a bolt 90 fitted with a thrust washer 92 and locking nuts 94. The spindle disc 58 includes a compression shoulder 96 such that when the locking nuts 94 are tightened the crankshaft 54 is pulled into the spindle 56. It will be noted that the spindle assembly is thus prestressed with the crankshaft 54 under tension and the spindle 56 under compression thereby providing a high degree of rigidity and stability.

During operation the spindle disc 58 is secured to the crankshaft disc 62 by a plurality of bolts 98. For purposes of adjustment the bolts 98 are loosened permitting the coupling disc 66 together with the crankshaft disc 62 to be rotated with respect to the spindle disc 58.

A crankshaft timing pulley 100 is fixed to the underside of the coupling disc 66 by a plurality of mounting bolts 102 (only one being shown) through oversize apertures 104 in the crankshaft disc 62. Each of the two crankshaft timing pulleys 100 are of the type adapted to receive and engage a toothed timing belt 106 which also meshes with an adjustment idler pulley 108 mounted on a shaft 110 supported in upper and lower bearings 112 and 114 respectively. An adjustment wheel 116 is attached to the shaft 110. A main drive pulley 118 is fixed to each spindle 56 such that both spindles may be driven in synchronous rotation via a drive belt 120, the drive motor being shown in FIG. 1.

To effect an adjustment of the amplitude of the oscillatory motion to be imparted to the first platen 12 it is necessary to simultaneously and equally adjust the position of the eccentric ends of both crankshafts 54 with respect to the axes of the rotation of the respective spindles 56. To accomplish this it is only necessary to loosen the lock nuts 94 at the bottom of each assembly as well as bolts 98. Rotation of the adjusting wheel 116 drives the adjustment idler pulley 108 and thus the timing pulleys 100. With the machine turned off the drive pulleys 118 and thus the spindles 56 remain stationary. Since the timing pulleys 100 are coupled to the crankshafts 54 via coupling disc 66, key 68, crankshaft disc 62 and key 64 the crankshaft 54 is rotated within the spindle 56 and the upper eccentric end of the crankshaft 54 is displaced more or less from the rotational axis of the spindle 56. Once the desired adjustment is accomplished the bolts 98 and lock nuts 94 are retightened and the adjustment idler pulley 108 is disengaged from the timing belt 106 for machine operation.

Figure 4A:
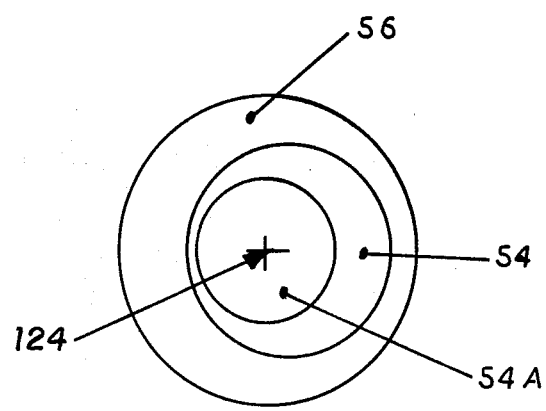
FIGS. 4A and 4B are schematic illustrations of the spatial relationships of the spindle and crankshaft at the adjustment extremes.
Figure 4B:
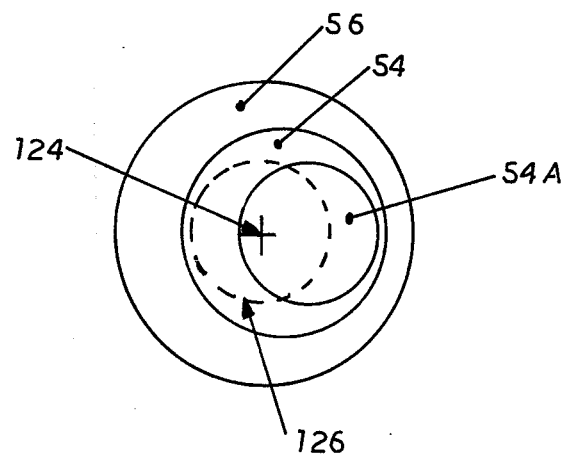

FIGS. 4A and 4B illustrate the relative positions of the spindle 56, crankshaft 54 and its eccentric upper end 54a relative to the rotational axis 124 of spindle 56. In FIG. 4A the crankshaft 54 is rotated to a first extreme such that the eccentric 54a is aligned with the rotational axis 124 of spindle 56. Thus as the spindle is rotated the oscillation amplitude would be substantially zero. FIG. 4B illustrates the crankshaft 54 after a maximum rotation of 180 degrees. The eccentric 54a is thus offset by a maximum distance from the rotational axis 124 of spindle 56. As the spindle 56 is rotated the eccentric 54a will describe the oscillatory rotary path shown by the dotted line 126.

The applicants have further found that is advantageous to machine a flat surface 128 at a predetermined position on each spindle disc 58 such that a zero alignment reference is provided. Thus when the spindle assemblies are installed in a machine a rigid flat bar may be bolted across the flat surfaces of the spindle discs to insure a proper initial orientation. The amount of material removed from the spindle discs and the location from which it is removed may be selected in such a manner as to also provide static balancing of the spindle assembly. It has further been found convenient to incorporate alignment markings 130 on the edges of the spindle disc 58 and coupling disc 66 with which to measure the crankshaft displacement.

From the foregoing discussion it will be understood that the applicants have provided a new and improved spindle assembly for use in apparatus for shaping electrodes whereby the objectives set forth hereinabove are efficiently achieved. Since certain changes in the above-described construction will occur to those skilled in the art without departure from the scope of the invention, it is intended that all matter set forth in the preceding description or shown in the appended drawings shall be interpreted as illustrative and not in a limiting sense.

Having described what is new and novel and desired to secure by Letters Patent, what is claimed is:

1. An improved apparatus for forming electrical discharge machining electrodes said apparatus being of the type including a first platen, a second platen mounted in superimposed relation and adapted to be driven vertically with respect to said first platen, a die member having an abrasive surface mounted on one of said platens, a workpiece member mounted on the platen opposite the platen on which said die member is mounted in working alignment with said die member, means for applying horizontal oscillatory rotary motion to said first platen, vertical drive means for infeeding said workpiece member and said die member into contact with each other while said oscillatory rotary motion is being applied to thereby abrasively shape said workpiece member to the form of said die member, and wherein said improvement comprises a plurality of spindles each having a longitudinal centerline axis of rotation and an axial aperture offset by a preselected distance from said axis of rotation;

a like plurality of crankshafts each rotatably disposed in said axial apertures in said plurality of spindles and having an upper eccentric portion coupled to said first platen;

means for locking each said crankshaft in rotation to its respective spindle such that upper eccentric portion of each said crankshaft is offset from said longitudinal centerline axis of rotation of its respective spindle by substantially the same predetermined distance;

means for driving said plurality of spindles in synchronous rotation about the longitudinal centerline axes thereof to thereby apply horizontal oscillatory rotation motion to said first platen; and means for simultaneously adjusting all said crankshafts in rotation relative to their respective spindles.

2. Apparatus as defined in claim 1 wherein said adjusting means comprises a plurality of spindle discs, one coupled to each said spindle at the lower ends thereof, extending horizontally outwardly therefrom, and being coupled to said driving means;

a plurality of crankshaft discs, one coupled to each said crankshaft at the lower ends thereof and extending horizontally outwardly therefrom;

a plurality of coupling discs, one disposed between each said spindle disc and said crankshaft disc, and fixed in rotation relative to said crankshaft disc;

means for locking each of said spindles in rotation;

means for driving all of said coupling discs in simultaneous rotation relative to said spindles; and means for securing said spindle discs, said crankshaft discs and said coupling discs in rotation relative to one another;

whereby the offsets of the eccentric portion of all said crankshafts are simultaneously adjusted relative to their respective spindles by a substantially identical amount.

3. Apparatus as defined in claim 2 wherein said coupling disc driving means comprises an adjustment idler pulley;

a plurality of crankshaft timing pulleys, one fixed to each said coupling disc;

a timing belt engaging said adjustment idler pulley and each of said crankshaft timing pulleys; and means for rotating said adjustment idler pulley to thereby simultaneously rotate all of said crankshafts by a substantially identical amount.

4. Apparatus as defined in claim 1 and further including means for retaining each said crankshaft in its respective spindle under longitudinal tension.

5. Apparatus as defined in claim 4 wherein each said retaining means comprises a compression shoulder between each spindle disc and each said spindle;

a threaded longitudinal aperture disposed in the lower end of each said crankshaft;

a thrust washer adapted to engage each said crankshaft disc;

a bolt disposed through said thrust washer and engaging said threaded longitudinal aperture in each said crankshaft such that when said bolts are tightened each said crankshaft is retained under tension within its respective spindle.

6. Apparatus as defined in claim 1 wherein each said spindle disc is provided with a flat surface at a predetermined position on the edge thereof to thereby provide a zero alignment reference such that the spindle discs may be aligned with one another for synchronous rotation.

7. Apparatus as defined in claim 2 wherein each said spindle disc and coupling disc are provided at their edges with incremental alignment markings to indicate the amount of rotation of said crankshafts relative to said spindles.

* * * * *